Figure 1:
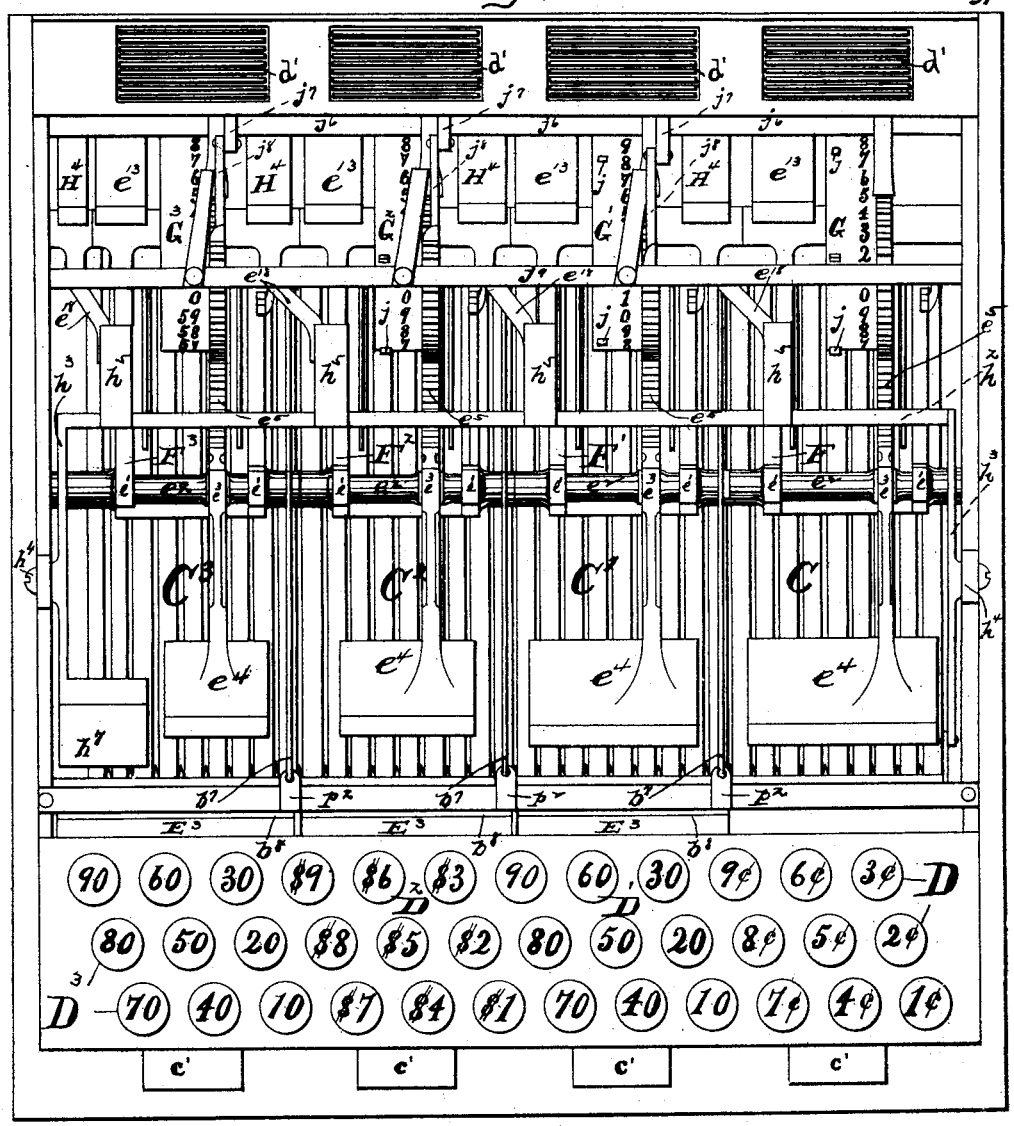

(No Model.) 11 Sheets—Sheet 1.

H. M. NEER.
CASH REGISTER AND INDICATOR.

No. 476,295. Patented June 7, 1892.

WITNESSES:
F. A. Rice
D. F. Graham

INVENTOR
Harry M. Neer
BY
ATTORNEYS

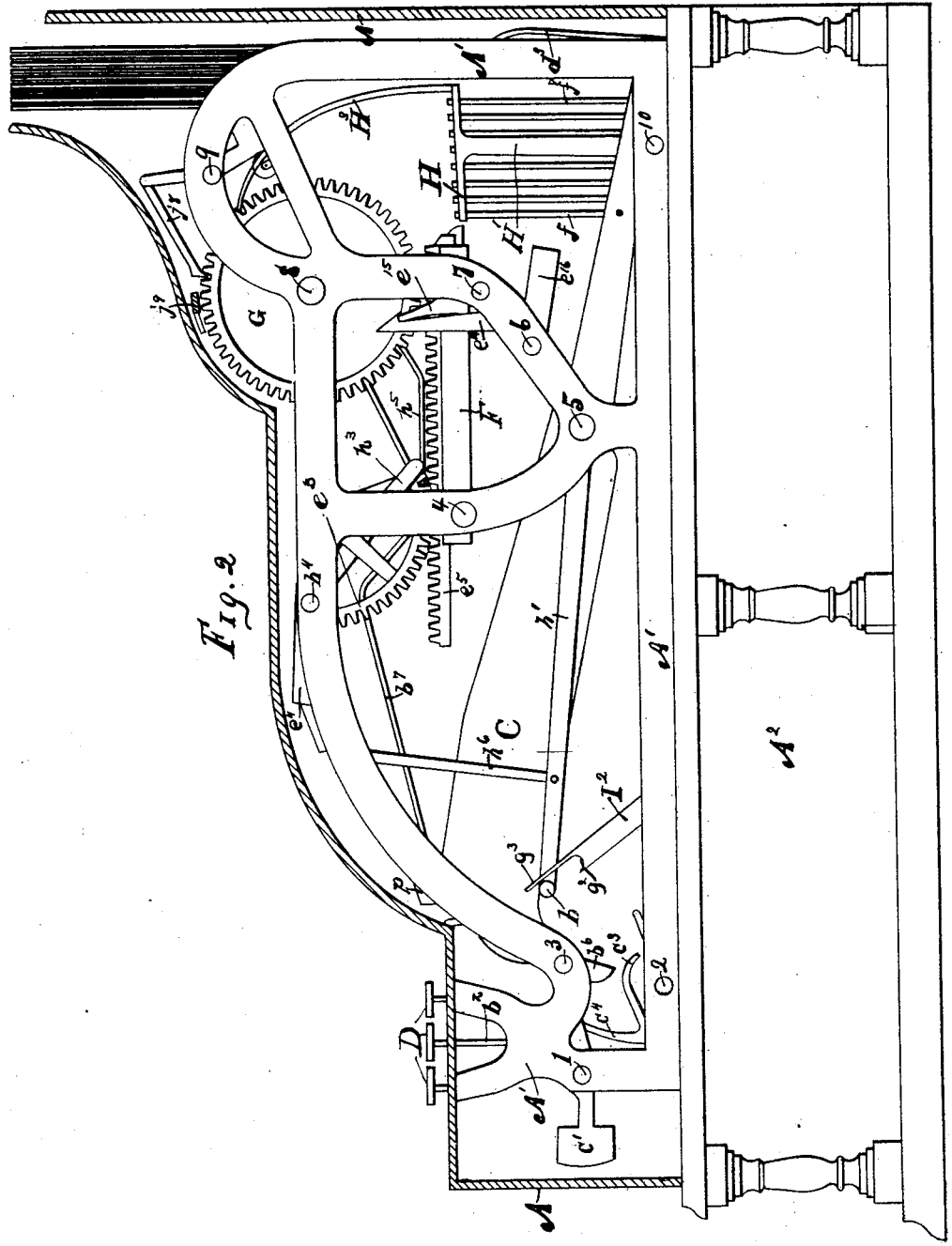

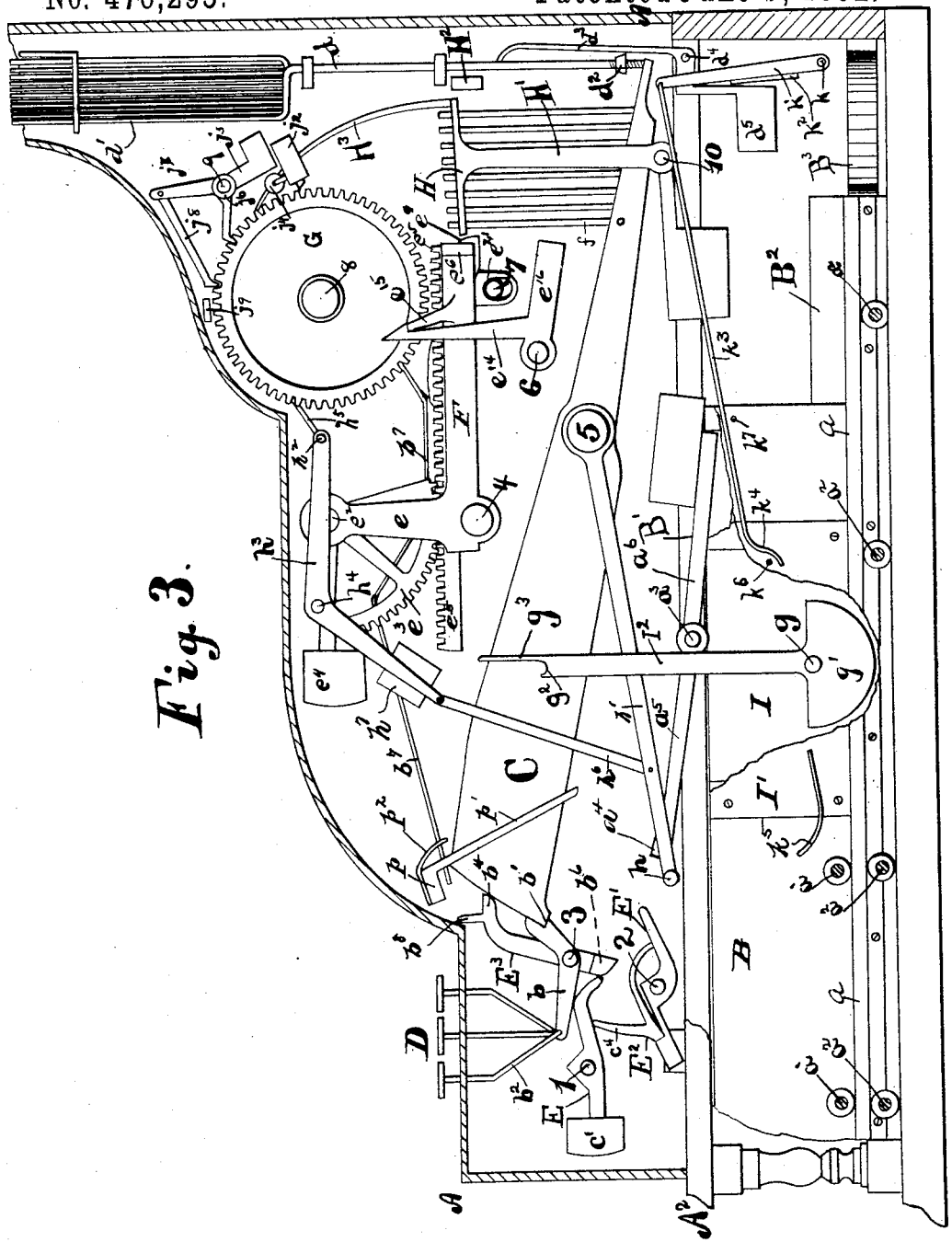

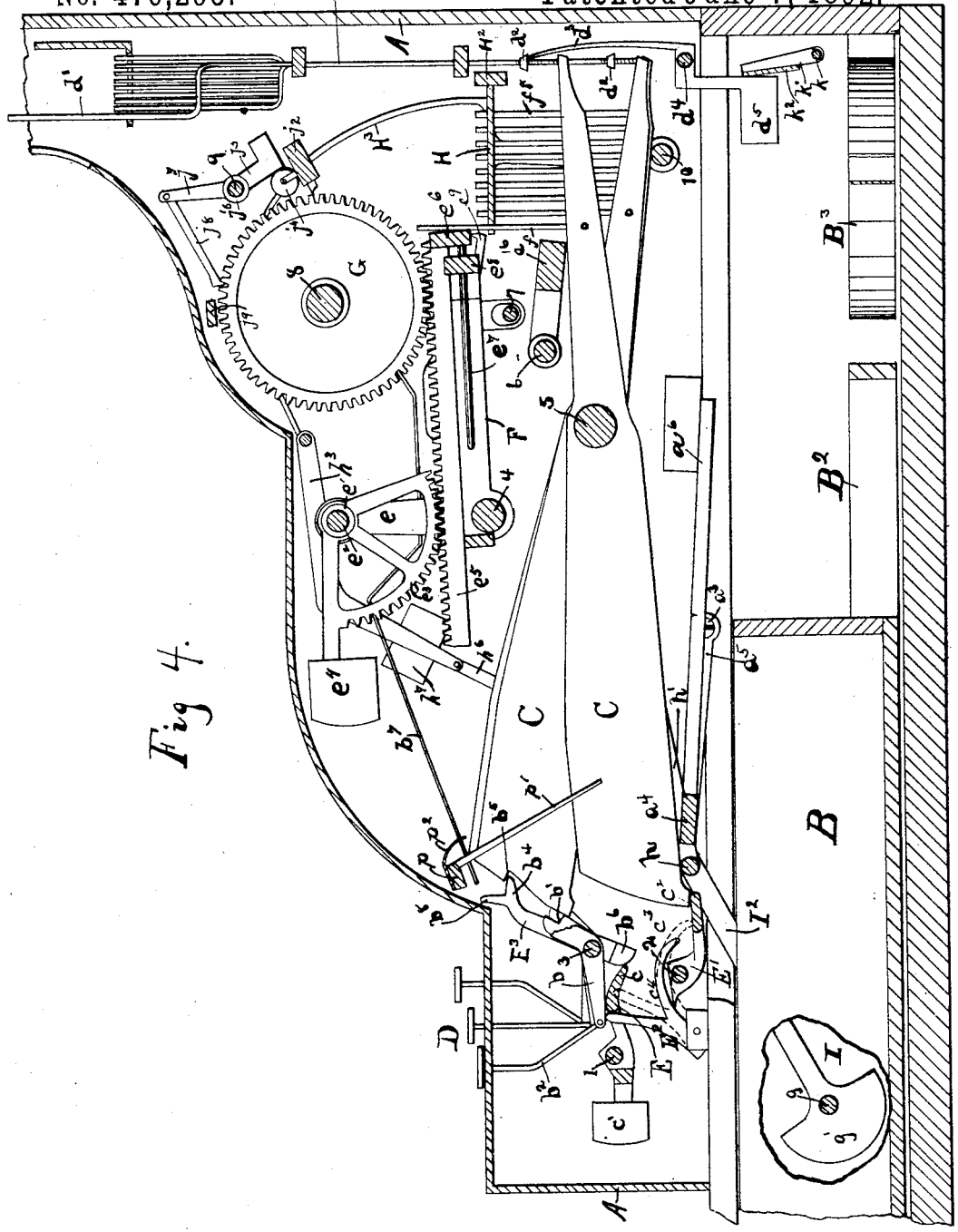

(No Model.) 11 Sheets—Sheet 5.
H. M. NEER.
CASH REGISTER AND INDICATOR.
No. 476,295. Patented June 7, 1892.
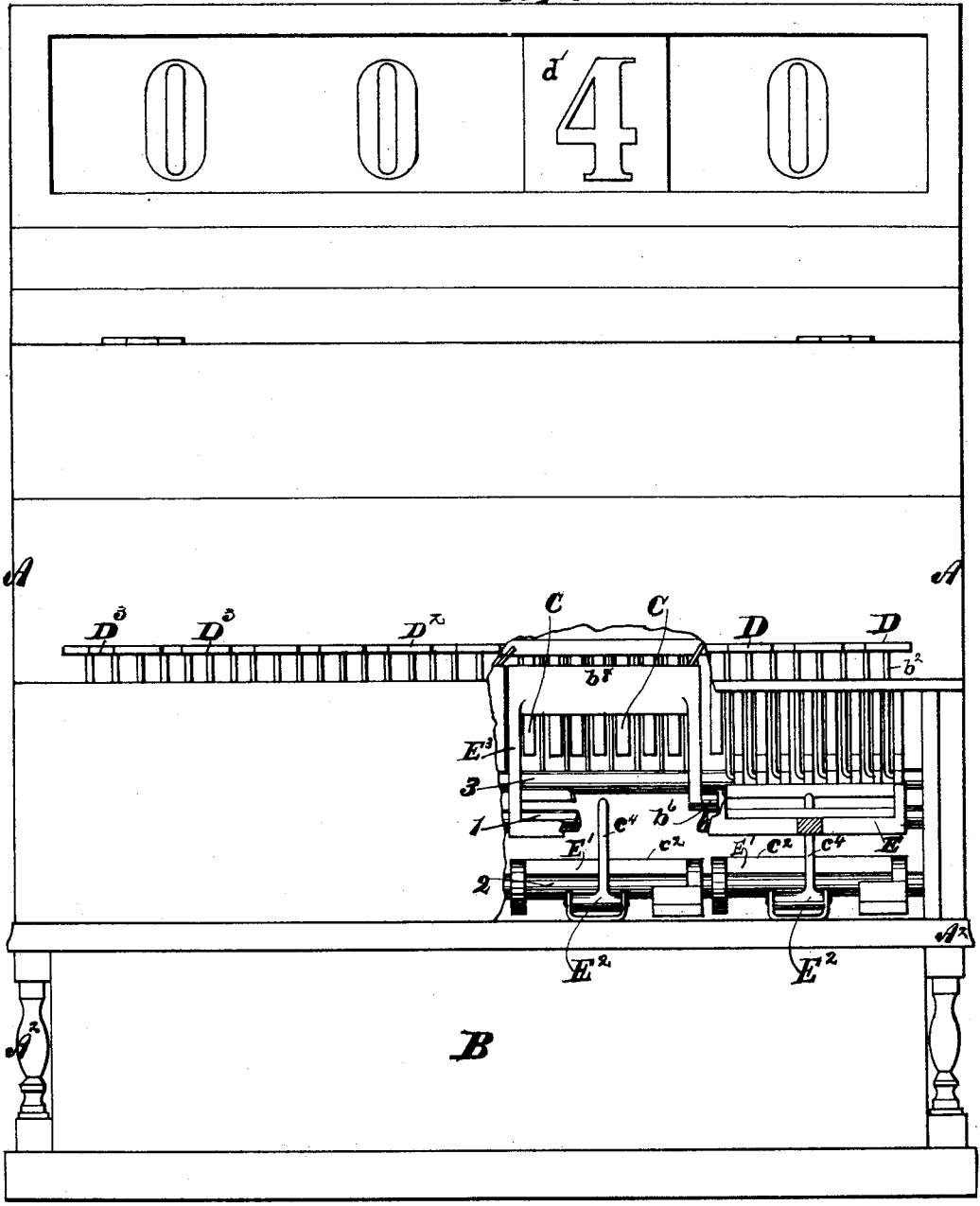
WITNESSES
F. A. Rice
D. J. Graham
INVENTOR
Harry M. Neer
BY Staley & Shepherd
ATTORNEYS (No Model.)  11 Sheets—Sheet 6.
H. M. NEER.
CASH REGISTER AND INDICATOR.
No. 476,295. Patented June 7, 1892.
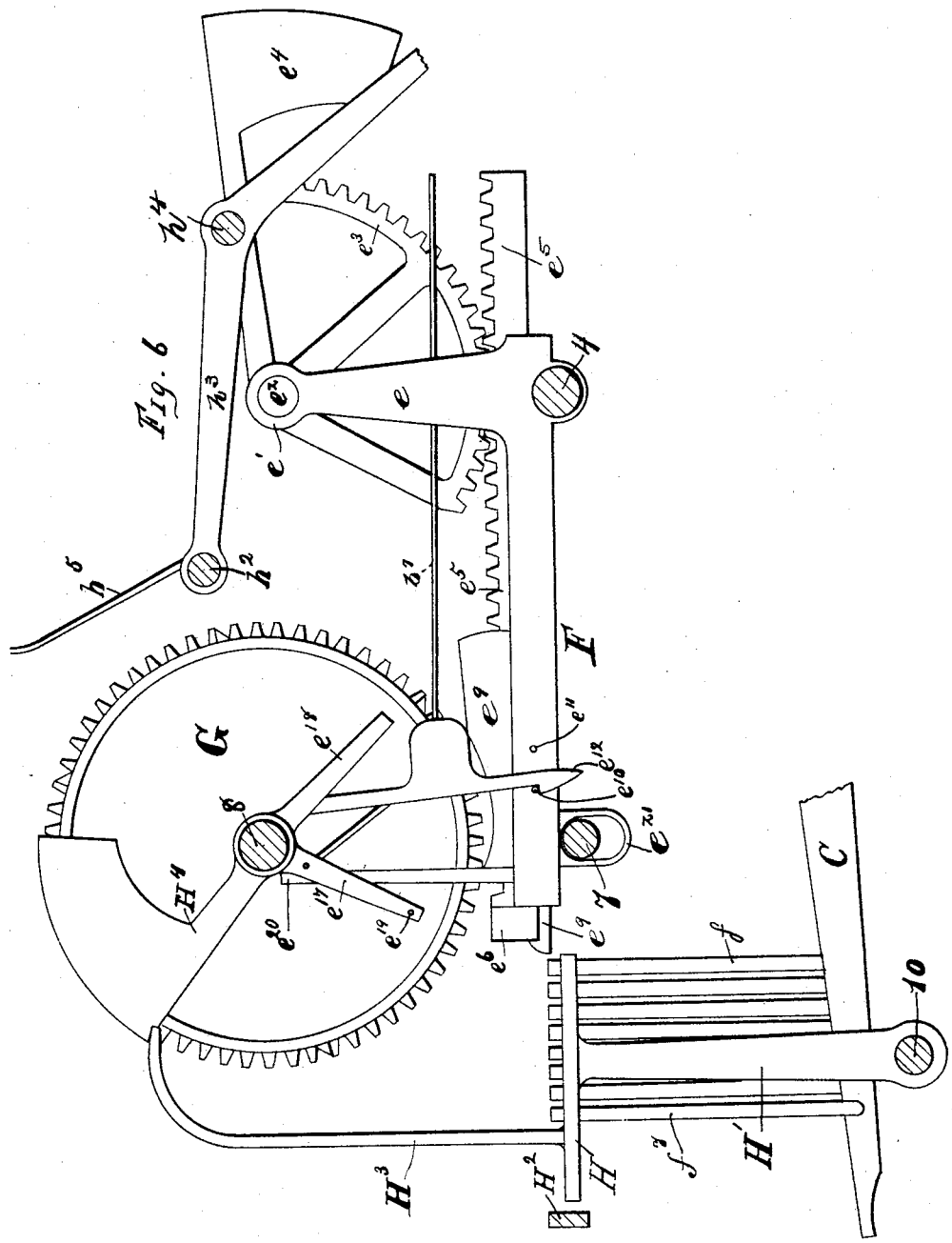
WITNESSES:
F. A. Rice
D. F. Graham
INVENTOR
Harry M. Neer
BY
Staley & Shepherd
ATTORNEYS

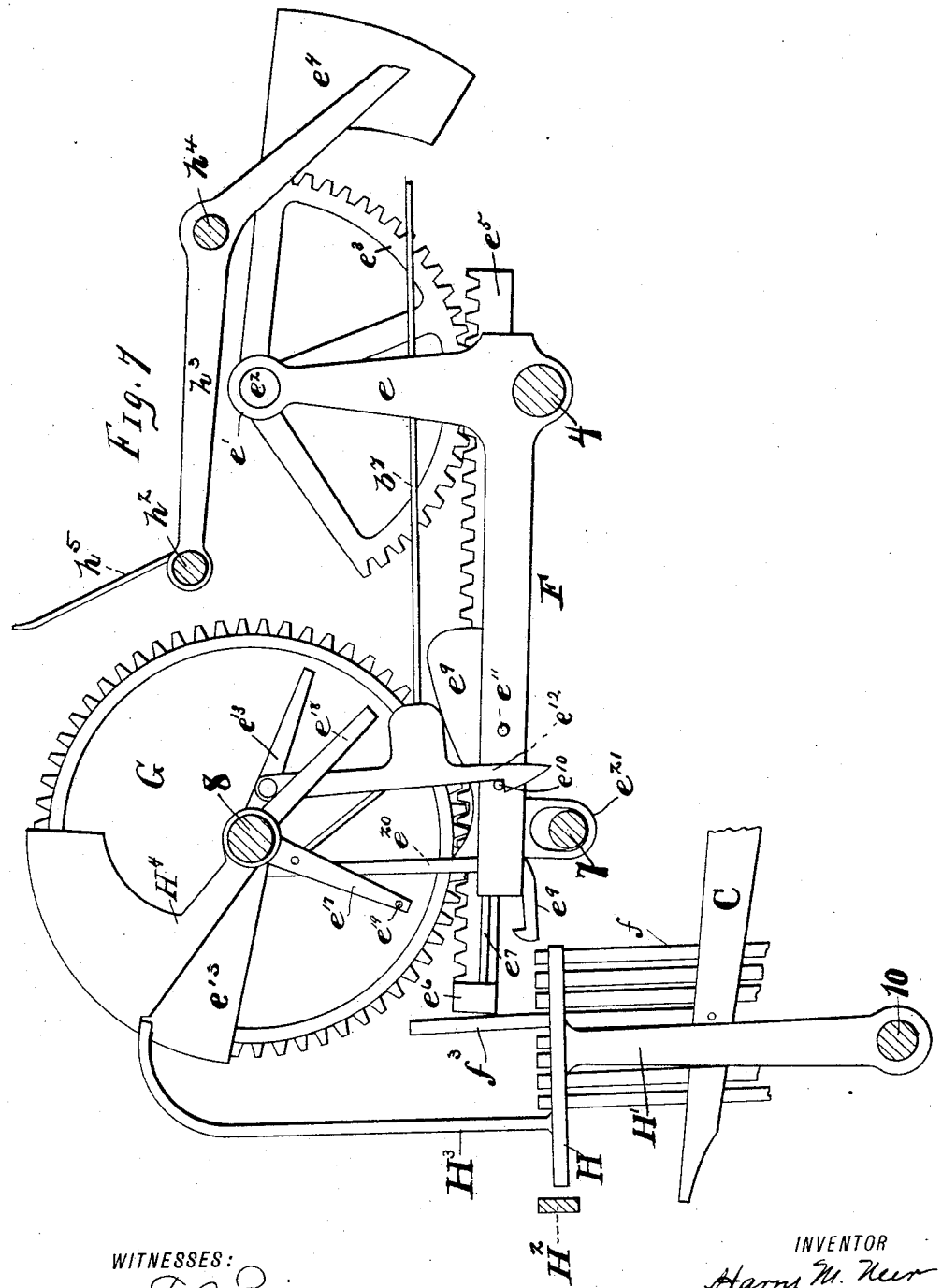

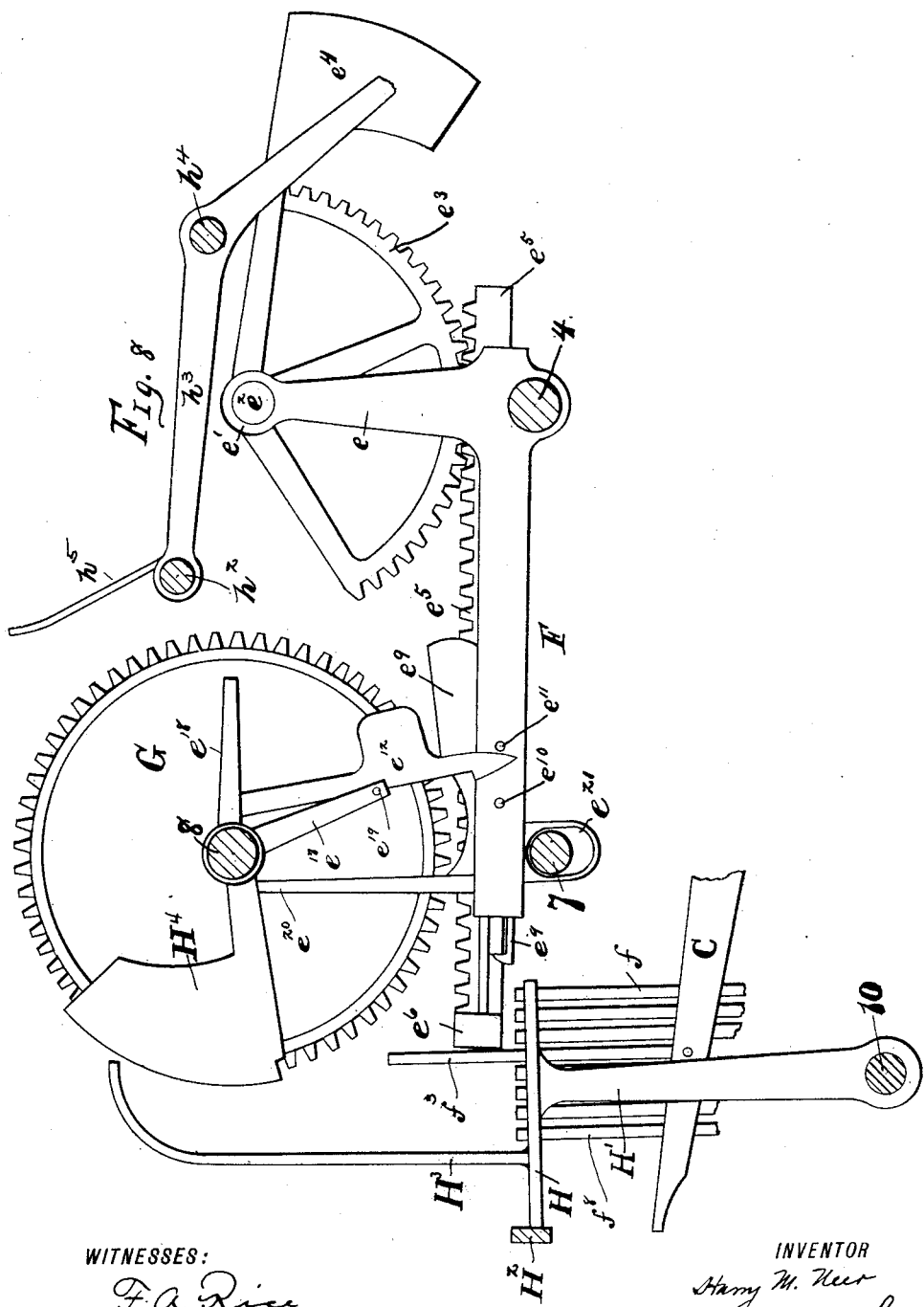

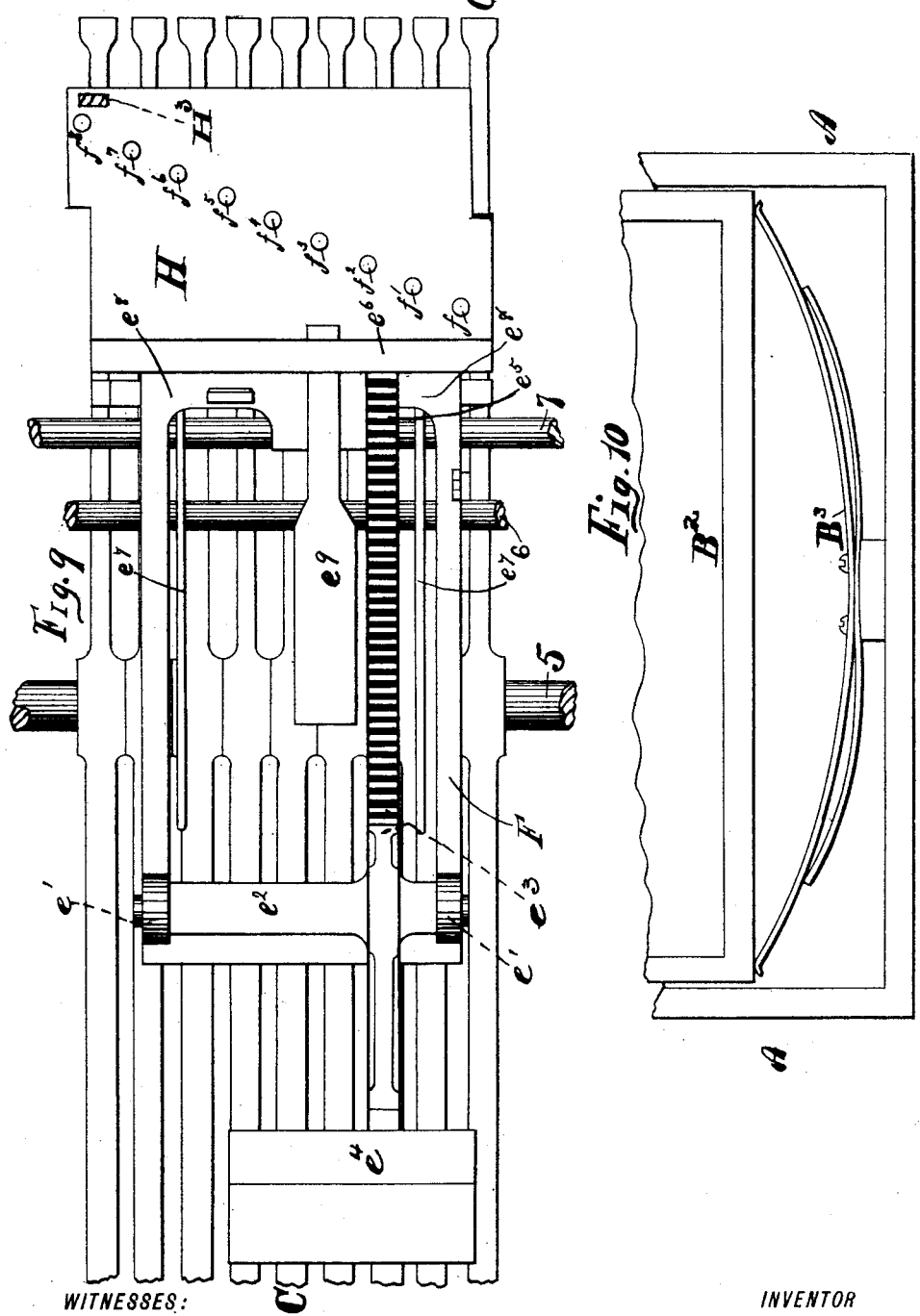

(No Model.)  11 Sheets—Sheet 10.
H. M. NEER.
CASH REGISTER AND INDICATOR.
No. 476,295.  Patented June 7, 1892.
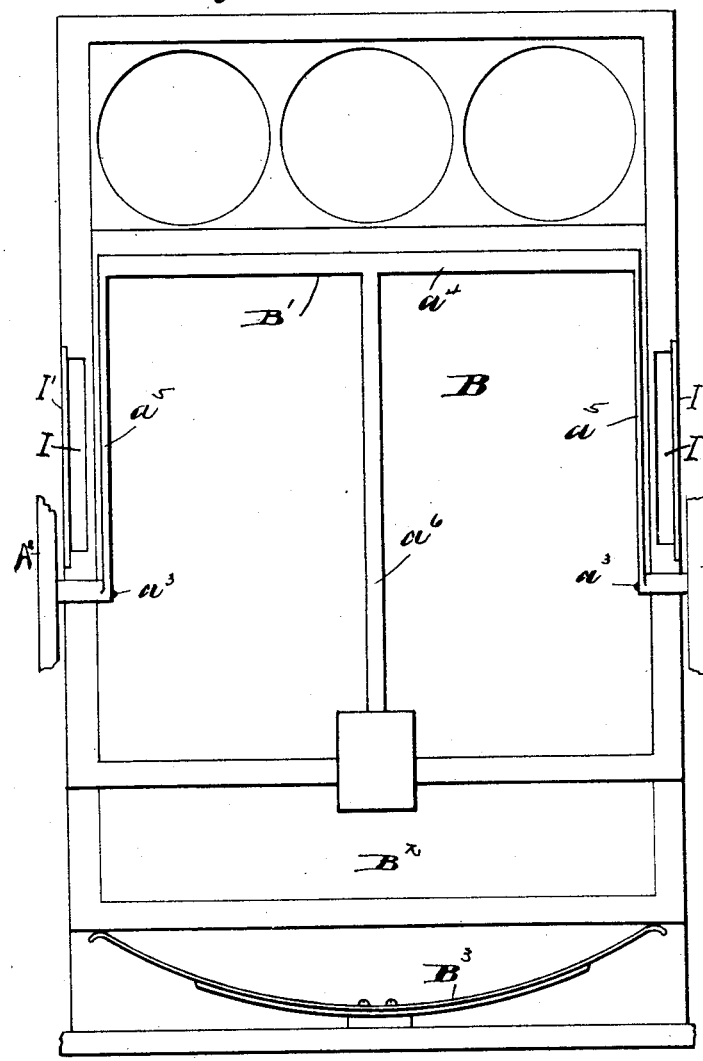
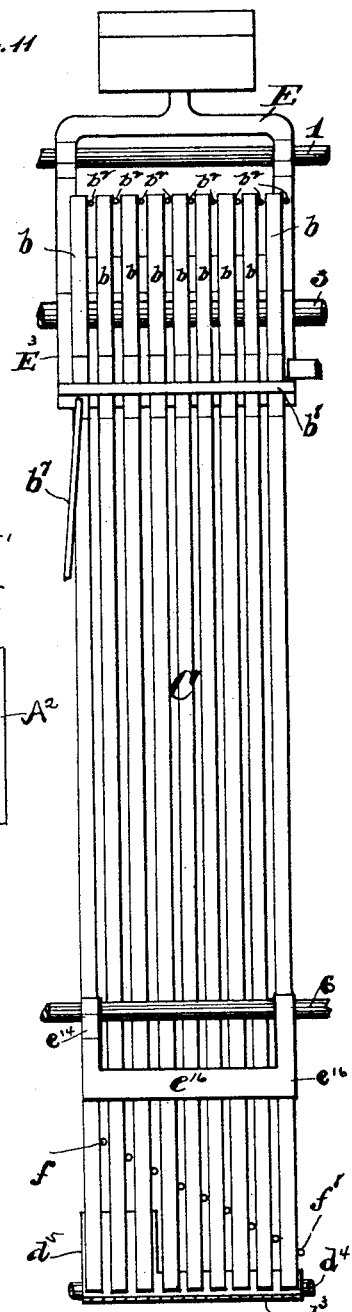
Witnesses
F. A. Rice
D. H. Graham
Inventor
Harry M. Neer
By Staley and Shepherd
Attys (No Model.) 11 Sheets—Sheet 11.
H. M. NEER.
CASH REGISTER AND INDICATOR.
No. 476,295. Patented June 7, 1892.
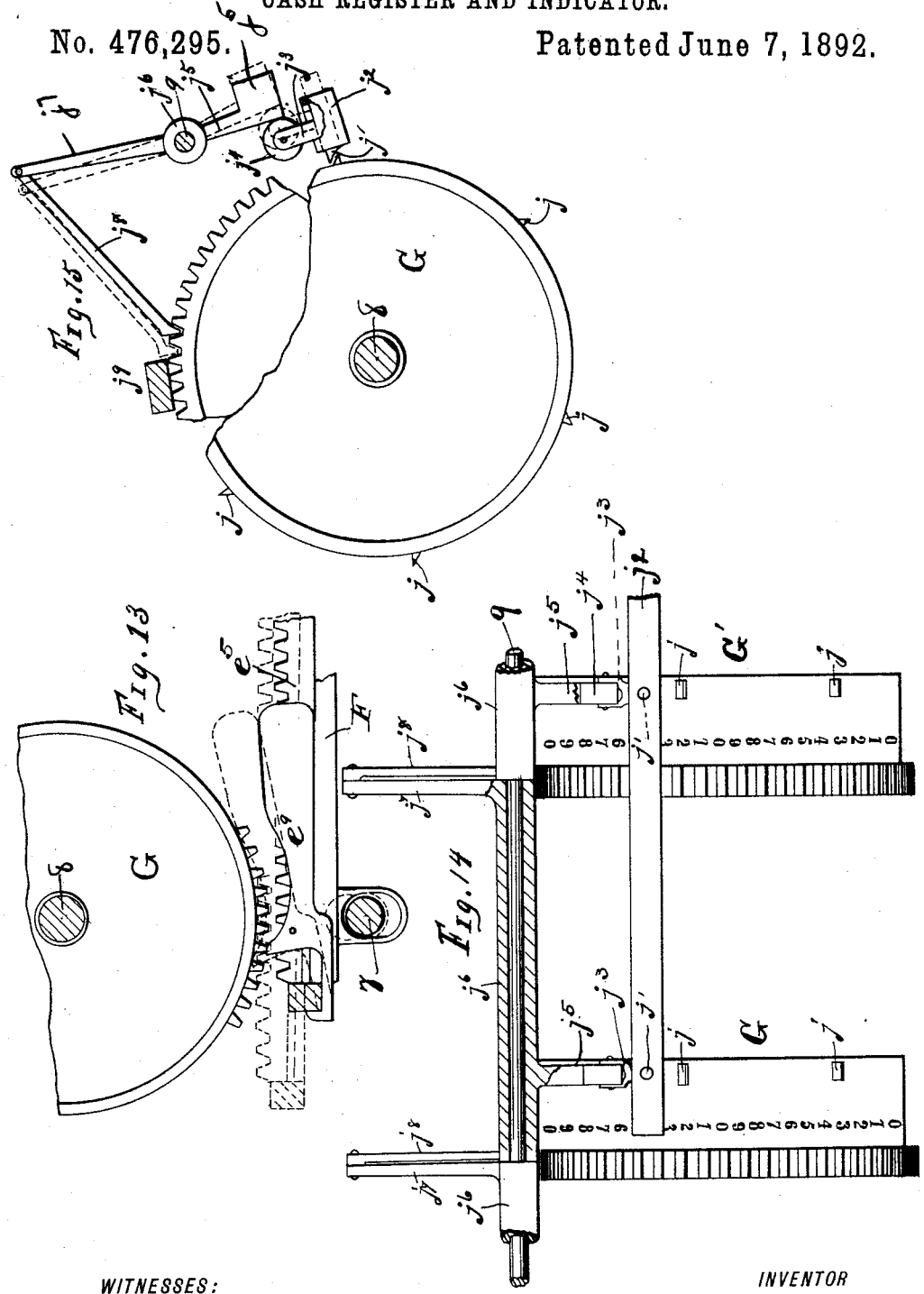
WITNESSES:
F. A. Rice
D. H. Graham
INVENTOR
Harry M. Neer
BY Philip M. Shepherd
ATTORNEYS

UNITED STATES PATENT OFFICE.

HARRY M. NEER, OF SPRINGFIELD, OHIO, ASSIGNOR TO HIMSELF, O. W. KELLY, AND THOMAS REYNOLDS, OF SAME PLACE.

CASH REGISTER AND INDICATOR.

SPECIFICATION forming part of Letters Patent No. 476,295, dated June 7, 1892.

Application filed June 1, 1891. Serial No. 394,785. (No model.)

*To all whom it may concern:*

Be it known that I, HARRY M. NEER, a citizen of the United States, residing at Springfield, in the county of Clark and State of Ohio, have invented certain new and useful Improvements in Cash Registers and Indicators, of which the following is a specification.

My invention relates to that class of cash registers and indicators in which a series of registering-keys are adapted when depressed to indicate the amount represented by said keys and register the same on a suitable registering mechanism; and it especially relates to that class of registers and indicators in which a number of series of keys are arranged with a definite number of keys in each series corresponding to dimes, dollars, and cents or other denominations of money to be registered, and arranged side by side, so that the amounts indicated shall read in their proper numerical order.

My invention consists in the various constructions and combinations of parts hereinafter described, and set forth in the claims.

In the accompanying drawings, which form a part of this specification, Figure 1 is a plan view of a device embodying my invention with the upper part of the outer casing removed. Fig. 2 is a side elevation of the same with one side of the casing removed. Fig. 3 is a similar view of the same with the side frame, as well as the casing, removed and showing the cash-drawer closed. Fig. 4 is a partial longitudinal sectional view through one of the series of registering mechanism, with the cash-receptacle shown partly broken away and in an open position. Fig. 5 is a front elevation of the machine, showing the case partly broken away and some of the parts in section. Figs. 6, 7, and 8 are side elevations of the registering mechanism of one of the series, the respective views showing the mechanism in different positions assumed in the operation thereof. Fig. 9 is a plan view of the same with the registering-levers. Fig. 10 is a partial plan view showing the operating-spring of the cash-receptacle. Fig. 11 is a plan view showing one series of the registering-levers and their connecting and operating mechanism. Fig. 12 is a plan view of the lower portion of the casing, showing the cash-drawer and the operating mechanism connected therewith. Fig. 13 is a detail of the registering mechanism. Figs. 14 and 15 are details of the adding mechanism for transferring amounts of one denomination or of one registering mechanism to the next higher.

Like parts are indicated by similar letters and figures of reference in the several views.

In the said drawings, A A represent the outer casing, which incloses a main supporting-frame consisting, essentially, of side plates or frames A' A', connected together by transverse connecting rods or shafts 1, 2, 3, 4, 5, 6, 7, 8, 9, and 10, on which the various operating parts of the machine are supported, pivoted, or journaled in the manner hereinafter more fully specified. These side frame-pieces A' rest on a rectangular frame $A^2 A^2$, forming the lower part of the outer casing, within which is inclosed the cash-receptacle, which consists of a sliding drawer B, having on the sides thereof suitable guides or ways $a$, supported between small supporting-rollers $a' a^2$, journaled on suitable bearing studs or pivots on the inside of the base of the casing A A. The drawer in its normal position is completely within the casing A A, in which position it is held locked by a locking-lever B', pivoted at $a^3 a^3$ to the respective sides of the outer casing. This locking-lever consists, essentially, of a transverse bar $a^4$, having side arms or fingers $a^5$, pivoted at their extremities to the casing, as described, and a central weighted arm or finger $a^6$, extended beyond the pivotal points $a^3$ and engaging with the rear end of the drawer B, as shown in Figs. 3 and 12, the weighted arm $a^6$ being adapted to overbalance the arm $a^4$, and thus cause said arm to drop by gravity and engage the back of the drawer when said drawer is pushed into its normal position in the casing. The drawer B is preferably provided with a rear extension $B^2$, against which a spring $B^3$ is adapted to operate to force the drawer open when released by the locking-lever B'.

Located above the drawer B and arranged in series within the casing are operating-levers C C' $C^2$ $C^3$, arranged in series of nine levers each and journaled or pivoted on the rod 5, which forms a part of the supporting-frame. Each lever in each series is an exact duplicate of the other levers, and each series of levers is provided with operating and connecting mechanism which is an exact counterpart of the other series, forming a registering device, each lever of each series being controlled by one of a series of keys D D' $D^2$ $D^3$ numbered from "1" to "9," respectively, and adapted when depressed to cause the number thereon through the medium of said levers to be registered on the registering mechanism of said series. In describing the registering mechanism, therefore, it is necessary to describe only one series, as the other series are duplicates thereof, and any desired number of series may be employed to increase the capacity of the machine, as desired.

In the further description I shall treat that portion of the machine from which the drawers open as the "front" of the machine and the opposite end as the "rear."

The front end of each lever is normally engaged by a small L-shaped trip-arm $b$, provided with a notched seat or shoulder $b'$, adapted to engage the bottom of said lever, and connected at the other extremity by a rod or stem $b^2$ to one of the keys D. These trip-arms are each pivoted or journaled on the frame-rod 3 and are adapted to be held in their normal positions by an oscillating frame E, journaled on the frame-rod 1, and provided with a cross-bar $c$, which extends across the entire series and bears against each of the trip-arms $b$, the said oscillating frame being preferably adapted to be held in contact with said trip-arms by a weight $c'$. The operating-levers C are also preferably formed with a preponderance of weight in front of the frame-shaft 5, on which they are pivoted, so that when released by the trip-arm $b$ they will drop by gravity. Each lever as it drops contacts with the bar $a^4$ of the locking-lever B', causing said bar to oscillate on its pivotal center, thus unlocking the drawer B. The rear extremity of each lever rests in contact with a reciprocating rod or stem $d$, which carries at its upper extremity an indicating-tablet $d'$, having thereon a number corresponding to the number on the key controlling said lever. On each rod or stem $d$ is a small projection $d^2$, consisting, preferably, of a disk or collar tapped out and screw-threaded on said rod. As the indicator is raised by the falling of said lever the projection $d^2$ is adapted to be engaged by a projecting finger $d^3$, pivoted at $d^4$ within the casing and provided with a weighted extremity $d^5$, which causes said finger to drop under said projection when the indicator is raised.

Arranged below the oscillating frame E is a similar pivoted frame E', journaled on the frame-rod 2 and provided with a bar $c^2$, arranged immediately below the front end of the lever C, so that each lever of the series in dropping will contact therewith. Resting loosely on the bar $c^2$ of the frame E' is a curved extended finger $c^3$ of a bell-crank arm $E^2$, pivoted to the main frame or casing, so that as the oscillating frame E' is moved on its pivotal center by the contact of the lever C said bell-crank $E^2$ will drop by gravity until the finger or arm $c^4$ thereof rests under the bar $c$ of the oscillating frame E. Means are thus furnished by which all of the keys in the series are locked as soon as one lever of the series has been released by pressing down one of said keys and said key has returned to its normal position.

Arranged above each series of levers is a skeleton supporting-frame F, journaled or pivoted at its front end on the frame rod or shaft 4. This skeleton frame F is provided on each side with upwardly-projecting arms $e$, provided at their upper extremities with bearings $e'$ for the axle $e^2$ of a gear-segment $e^3$, the said gear-segment being provided with an extended weighted arm $e^4$, adapted to cause said gear-segment when released to revolve by gravity in the bearings $e'$. Arranged below and meshing with the gear-segment is a rack $e^5$, connected at the rear to a cross-bar $e^6$, from which extend longitudinal guiding-rods $e^7$, passing through suitable guiding-bearings $e^8$ in the skeleton frame F. Arranged at the rear of the frame F and adapted to engage with the bar $e^6$ of the rack $e^5$ is a pivoted catch-lever $e^9$, which holds said rack and its engaging segment in their normal positions, with the weighted arm $e^4$ elevated to the position shown in Fig. 6. The frame F is provided on one side with an engaging pin or projection $e^{10}$, Fig. 7, and a stop-pin $e^{11}$, the one $e^{10}$ being adapted to be engaged by the hook-shaped end of a connecting-arm $e^{12}$, pivoted at its other end to a weighted arm or lever $e^{13}$, journaled on the frame rod or shaft 8. This frame rod or shaft also carries the registering-wheels G G' $G^2$ $G^3$ of each series, each arranged immediately above the rack $e^5$ and provided on its periphery with gear-teeth adapted to be engaged by said rack in the manner hereinafter more fully specified.

Arranged in the rear of the cross-bar $e^6$ of each rack is a series of vertical sliding stop-pins $f$ $f'$ $f^2$ $f^3$, &c., extending upwardly through a bearing-plate H, and each connected below said plate to one of the levers C. These stop-pins $f$ are arranged in the plate H one behind the other a distance equal to the pitch of the teeth in the rack $e^5$ and its intermeshing gear-segment. The weighted arm $e^{13}$, through the hook-shaped connection $e^{12}$ and the engaging pin $e^{10}$, serves to draw the frame F and the rack $e^5$ toward the registering-wheel G. The frame, however, is held in its normal position, as shown in Fig. 6, with the rack out of engagement with said wheel, by a hook-shaped arm or catch $e^{14}$, Figs. 2 and 3, which engages with a projecting finger $e^{15}$ on said frame. The hook-shaped catch $e^{14}$ is pivoted at its lower end to the frame rod or shaft 6 and has a projecting bar $e^{16}$, which extends across the entire series of operating-levers, so as to be engaged by each of said levers. As each operating-lever is released, therefore, as before described, the stop-pin $f$ corresponding to said lever is elevated. The lever coming in contact with the bar $e^{16}$ of the hook $e^{14}$ releases the frame F, which, through the action of the weighted arm $e^{13}$, is caused to oscillate on the frame-bar 4 until the rack $e^5$ engages with the teeth of the registering-wheel G. At the same time the pivoted catch-lever $e^9$, Fig. 13, comes in contact with the rim of the registering-wheel G and is depressed, so as to release said rack, which moves rearwardly by the action of the weighted arm $e^4$ and the gear-segment $e^3$ until it strikes the stop-pin $f$ of the operating-lever, thus causing the registering-wheel to revolve a portion of a revolution, representing the number of teeth corresponding to the number of the controlling-key of said operating-lever, the operating parts being at this point of the operation in the position shown in Fig. 7.

The supporting-plate H, which supports the top of the respective stop-pins $f$ of each series, is supported on pivoted arms H', journaled at their lower ends on the frame shaft or rod 10, and is capable of a limited rearward movement before it comes in contact with a stop-bar $H^2$. A projecting finger $H^3$ on said plate engages with a shoulder or projection on a weighted bell-crank lever $H^4$, also journaled on the frame-shaft 8. As the cross-bar $e^6$ of the rack $e^5$ comes in contact with any of the stop-pins of the series a limited movement is imparted to the supporting-plate H, which carries the finger $H^3$ out of engagement with the bell-crank arm $H^4$, permitting said arm to move by gravity about its pivoted center. The bell-crank arm $H^4$ has two projecting fingers $e^{17}$ $e^{18}$, one of which is provided with an engaging projection $e^{19}$, adapted as the arm is moved by gravity to contact with the connecting-arm $e^{12}$, and thus force the hook-shaped extremity of said arm out of engagement with the pin $e^{10}$ and against the stop-pin $e^{11}$, thus releasing the frame F. The weighted arm $e^{13}$ is also thus released, permitting a further movement of said arm, which causes it to contact with an upwardly-projecting spur $e^{20}$ on said frame, thus forcing said frame to its normal position and carrying the rack out of engagement with the registering-wheel, the respective parts being then in the position shown in Fig. 8.

Each registering-wheel is divided on its periphery into a number of notches or spaces corresponding to the number of teeth, which notches or spaces are numbered in series from "0" to "9," as shown in Fig. 14, any number of series being employed, sixty teeth and six series of notches or spaces being used on each registering-wheel in the machine shown in the drawings. It will be seen that by the mechanism thus far described means are provided by which each registering-wheel is turned a number of notches corresponding to the number of the key depressed by the action of the operating-lever controlled by said key. The drawer is at the same time released and automatically opened. If desired, any suitable and well-known device may be employed for producing an alarm in a well-known manner as the drawer opens.

On each side of the drawer is formed a pocket or recess I, covered by a plate I'. Within this recess is pivoted at $g$ to the plate and side of the drawer, respectively, a weighted lever or finger $I^2$, the weighted extremity $g'$ of which is adapted to hold the arm or finger normally in a vertical position.

Extending across the casing, below the operating-levers C, is a rod or bar $h$, connected at each end to arms $h'$, journaled on the frame shaft or bar 5. The extremities of the bar $h$ are extended beyond the arms $h'$, so as to lie across the path of the pivoted arm $I^2$ as the drawer is opened. This arm $I^2$ is provided at its upper extremity with an open bearing $g^2$ and a projecting finger $g^3$ at one side of said bearing. As the drawer moves outwardly, the arm $I^2$ engages with the bar $h$, and is thus turned on its pivotal center and slides along said bar until the finger $g^3$ comes in contact with said bar as the drawer has reached the limit of its outward movement. As the drawer is closed, the open bearing $g^2$ of the arm $I^2$ engages with the bar $h$, as shown in Fig. 4, and causes said bar to move, with the pivoted arms $h'$, on the arc of a circle about the frame-shaft 5, and coming in contact with the levers C, which may have been released in each series, carries them back to their normal positions, where they are engaged by the trip-arm $b$. The frame E' as the operating-lever is removed therefrom returns by gravity to its normal position, carrying the bell-crank arm $E^2$ out of engagement with the frame E, which is thus released and permits the respective catch-arms to engage with the operating-levers, so that all of the parts are again in their normal positions. A transverse rod or bar $h^2$, Fig. 7, supported at each end in pivoted bell-crank arms $h^3$, pivoted at $h^4$ at each side of the main frame, is provided, and has a series of projecting fingers $h^5$, one for each series of levers, adapted to engage with the extended portions of the weighted arms $e^{13}$ and $H^4$ of the registering mechanism and return said weighted arms to their normal positions. A movement of the bar or rod $h^2$ to accomplish this is secured from one of the pivoted arms $h'$ through the medium of a connecting-link $h^6$. The bar $h^2$ also comes in contact with the gear-segments $e^3$ and returns said segments, together with their intermeshing racks, to their normal positions. The respective catches $e^{14}$ and $e^9$, Fig. 3, engage with the frame and rack, respectively, and thus hold all of the parts in their normal positions. A weight $h^7$, connected to one of the bell-cranks $h^3$, serves to return the bars $h'$ and $h^2$ to their normal positions as soon as the arm $I^2$ is disengaged from the extremities of the bar $h$ by the closing of the drawer, as shown in Fig. 2.

To provide for adding the amount registered on one registering-wheel with that registered on the other wheels when a lower registering-wheel has registered a number of units corresponding to one unit of the next higher registering-wheel, I provide on the periphery of each registering-wheel a series of projections $j$, arranged at the side of the engaging-teeth of said wheel. These projections $j$ mark divisions of the registering-wheel, each of which includes a number of units corresponding to a unit of the next higher wheel. In the present case six of these projections $j$ are employed, making six divisions on the registering-wheels, each of which includes ten teeth, as the respective wheels are adapted to register cents, dimes, dollars, tens of dollars, &c. Arranged adjacent to the registering-wheels G in the plane of the projections $j$ is a sliding pawl $j'$, supported in a suitable bearing on the transverse bar $j^2$, connecting the respective side frames A' A'. This pawl $j'$ is beveled at one end and adapted to contact with a similar beveled face on the respective projections $j$, so that as each projection passes said pawl a reciprocating movement is imparted thereto. Projecting arms or lugs $j^3$ on said pawl support a small roller $j^4$, adapted as said pawl is moved to contact with a depending weighted arm $j^5$, connected to a sleeve $j^6$ on the frame-bar or shaft 9. This sleeve $j^6$ is made of a length equal to the distance between the respective registering-wheels, and is provided at its other end with an upwardly-projecting arm $j^7$, carrying a pivoted pawl $j^8$, which engages with the registering-teeth of the next succeeding registering-wheel, as shown in Figs. 14 and 15. To provide for moving the wheel of the higher denomination one unit only, I employ a stop-bar $j^9$, which extends entirely across the machine and is adapted to form a stop for the pawl $j^8$ as soon as said pawl has moved a distance equal to one notch of the registering-wheel. The pawl is also so shaped as to fit between the engaging-teeth on said wheel, and thus form with said bar a positive stop to prevent said wheel from moving by its momentum or otherwise beyond the movement of said pawl. As soon as any projection $j$ has passed the pawl $j'$ the parts are returned to their normal positions by the weighted arm $j^5$, the backward movement being sufficient to return the pawl just one notch on the periphery of the registering-wheel, where it is in a position to be operated by the next succeeding projection $j$. It will thus be seen that means are provided for adding the various amounts registered on one wheel to those on the other wheels, so that each wheel contains only the number of units of the particular denomination which it represents. By the arrangement described it becomes necessary at certain periods in the operation of the machine for the gear-segment and rack of the first series to move the registering-wheels of all the series. For this reason I preferably provide said segments with weights of different size from left to right, so that each segment will be sufficiently weighted to move all of the registering-wheels to the left thereof. It will be seen that as thus described means are provided for registering any amount indicated on any one of any series of keys and that amount when registered will be transferred when necessary from one denomination to the other. When the keys are struck in successive order, it does not matter which key or which series is struck first, as the operation of registering and releasing the drawer by each operating-lever of each key is practically instantaneous. In the event, however, that two keys in a different series are depressed simultaneously it might happen that the adding projection on one registering-wheel would operate its adding mechanism during the time the next registering-wheel was in operation, in which case the adding or transferring operation would be lost. To obviate this and to cause the operating-levers of the different series to operate successively from right to left when keys in two or more series are simultaneously depressed, I provide for each series of levers an auxiliary locking bar or frame $E^3$, pivoted on the frame shaft or bar 3 and provided with a projecting flange $b^4$, adapted to engage in a notch or shoulder $b^5$ in each operating-lever of a series. Each of these auxiliary locking-levers $E^3$ is provided with a projecting arm $b^6$, adapted to be engaged by the oscillating frame E of the next series, so that as the vibrating frame E of one series is depressed by depressing a key of said series the auxiliary locking-lever $E^3$ of the next series is released and falls into engagement with the notches or shoulders $b^5$ of all of the levers of the next series. The arm $b^6$ is so constructed that the first downward movement of the key releases the auxiliary locking-frame $E^3$ and permits it to drop into engagement with the levers of its series prior to the time that the trip-lever $b$ is disengaged from its operating-lever. To provide for disengaging the auxiliary locking-lever $E^3$ when the registration has been completed in the next preceding series, I provide a push-rod $b^7$, connected at one end to the weighted bell-crank $H^4$ of one series and adapted to contact with a projecting arm or flange $b^8$ of the auxiliary locking-lever $E^3$ of the next succeeding series, so that the operation of disengaging the operating-rack from the registering-wheels as soon as the registration is completed also disengages the auxiliary locking-lever $E^3$ of the next series and permits the lever of said series corresponding to the key depressed to drop, thus registering the amount thereon, the registration of the respective series being performed in successive order.

The stop-faces on the respective levers adapted to be engaged by the trip-lever $b$ and auxiliary locking-lever $E^3$ are so arranged that a slight movement of the operating-lever is permitted when released by its trip before it contacts with the flange $b^5$ of the locking-lever $E^3$, so that the trip-lever cannot re-engage said operating-lever until all of the parts have been returned to their normal positions in the manner before described.

As before stated, as each lever is depressed a corresponding indicator is elevated and held in its elevated position by the projection $d^2$ thereon engaging with a finger $d^3$, which retains the indicator in this position when the parts are returned to their normal position by the closing of the drawer.

Pivoted at $k$, at each side of the casing A A, is a small projecting arm $k'$, the respective arms being connected together by a plate $k^2$, which extends entirely across the casing in the rear of the drawer and is adapted to engage with the weighted arm $d^5$ of each of the pivoted fingers $d^3$. Extending from the arm $k'$ along the side of the drawer B is a wire $k^3$, provided with a double or S-shaped bend $k^4$ and a hook-shaped end $k^5$. This wire is adapted to pass between two projecting pins $k^6$ and $k^7$, arranged at different positions in the length of said drawer, so that as the drawer is opened the pins are caused to bind on opposite sides of the wire by reason of the S-shaped bend described, as shown in Fig. 3, thus producing a frictional contact with said wire which moves the arms $k'$ and through them the fingers $d^3$ and releases all of the indicators remaining up when the drawer is opened unless said indicators correspond to the keys depressed in the operation of opening the drawer, in which latter case they would still be held in their elevated position by the operating-levers. As the drawer is closed the frictional contact with said wire returns the arms $k'$ to their normal positions, thus permitting the finger $d^3$ to fall into engagement with any of the indicators which may have been elevated as the drawer was opened. When the levers $k'$ are returned to their normal positions, the projecting pins $k^6$ and $k^7$ are moved away from the respective bends in said wire and thus release the same to permit the drawer to travel its full length with a limited travel only of the arms $k'$.

The operating-levers C of each series are held against lateral movement in their operation by projecting fingers $p'$, which depend from a transverse bar $p$, extending across the casing, each lever being adapted to operate between two of said fingers. The said bar $p$ is also provided with small projecting arms $p^2$, perforated to form a sliding bearing for the push-wire $b^7$.

It should be stated that the oscillating frame E' of each series is permitted a limited movement in returning to its normal position, sufficient to cause the trip-levers $b$ to engage with the operating-levers of that series without disengaging the auxiliary locking-lever E³ from the operating-levers of the next series. When said auxiliary lever has engaged the operating-levers of its series, as before described, by the simultaneous depression of two or more keys in different series, this movement of the oscillating frame E is also sufficient to permit the bell-crank locking-lever E² to drop under the cross-bar $c$ of said lever, and thus lock said lever against any further downward movement, so that all the remaining operating-levers of this series will be automatically locked when one lever of the series has been released, whether two or more levers in different series are simultaneously released or not.

A depending loop $e^{21}$ is preferably provided on each oscillating frame F, adapted to encircle the frame-shaft 7, and thus limit the upward movement of said frame to prevent the racks $e^5$ from meshing too deep with the gear-teeth on the registering-wheel. This loop also furnishes the means for limiting the movement of the frame F in either direction about its pivotal center.

It is thought that the operation will be understood from the above description. Briefly stated, it is as follows: A key in any series being depressed, the operating-lever C corresponding to said key is released and falls by gravity, contacting with the transverse bar $a^4$ of the drawer-locking lever B', thus withdrawing said lever from engagement with the drawer B, which is forced open by the spring B³. The operating-lever C also contacts in its descent with the pivoted frame E', thus oscillating said frame and permitting the bell-crank E², supported by said frame, to drop under and lock the oscillating frame E, which was depressed by the downward movement of the key, but was returned to its normal position by the weight $c'$ as soon as said key was released. The drawer is thus opened and the remaining keys of that series are locked. The dropping of the front end of the operating-lever C has produced an upward movement of the rear end, which elevates the indicating-tablet connected to said lever and also the stop-pin $f$ corresponding thereto. The oscillating frame F and the sliding rack $e^5$ have also been released by the contact of said lever with the hook-shaped catch $e^{14}$, which holds said frame in its normal position, the frame being oscillated by the pivoted arm $e^{12}$ until the rack $e^5$ engages the teeth of the registering-wheel G, at which time the pivoted catch-lever $e^9$ comes in contact with the rim of the registering-wheel G, so as to release said rack, which moves rearwardly by the action of the weighted arm $e^8$ until it strikes the stop-pin $f$ of the operating-lever, thus causing the registering-wheel to revolve a portion of a revolution corresponding to the number of the controlling-key of said operating-lever. As the rack $e^5$ comes in contact with the stop-pin $f$ a limited movement is imparted to the supporting-plate H, through which said stop-pin operates, thus carrying the finger H³ out of engagement with the bell-crank arm H⁴, permitting said arm to move by gravity about its pivoted center until the engaging projection $e^{19}$ contacts with the connecting-arm $a^{12}$, forcing said arm out of engagement with the pin $e^{10}$ and against the stop-pin $e^{11}$, thus releasing the frame F. The weighted arm $e^{13}$ is thus released from the arm F, permitting a further downward movement of the said arm, causing it to contact with the upwardly-projecting spur $e^{20}$ on said frame, thus forcing the said frame to its normal position and carrying the rack out of engagement with the registering-wheel and the registration is completed. As the drawer moves outward by the action of the spring the pivoted arm $I^2$ is brought into engagement with the bar $h$ and turns on its pivotal center until the finger $g^3$ of said arm contacts with said bar as the drawer reaches the limit of its outward movement. As the drawer is closed, the open bearing $g^2$ of the arm $I^2$ engages with the bar $h$ and as the drawer is closed elevates the said bar in contact with the operating-levers C, which may have been released in each series and carries them back to their normal positions, where they are engaged by the trip-arms $b$, attached to the operating-keys. The frame E', as the operating-lever is removed therefrom, returns by gravity to its normal position, carrying the bell-crank arm $E^2$ out of engagement with the oscillating frame E, which is thus released and permits the respective trip-levers to engage with the operating-levers. The upward movement of the bar $h$ through the medium of the connecting-link $h^6$ causes the pivoted bar $h^2$ to move about its pivoted center, thus bringing the projecting fingers in contact with the extended portions of the weighted arms $e^{13}$ and $H^4$ of the registering mechanism, and thus returns the said weighted arms to their normal positions. All the parts are thus returned to their normal positions, except the indicators, which are held in their elevated positions by the finger $d^3$, engaging with the projection $d^2$ until the drawer is again opened. The outward movement of the drawer through the medium of the connecting-wire $k^3$ and the engaging pins $k^6$ $k^7$ produces a movement of the plate $k^5$, causing it to engage with the weighted arm $d^5$ of each of the pivoted fingers $d^3$, thus removing said fingers from the projections on the tablet-stems and permit said stems to return to their normal position. The depression of a key in the first series releases the auxiliary levers $E^3$ of the next succeeding series as the oscillating frame E moves out of engagement with the projecting arms $b^6$ of the auxiliary locking-levers, so that each successive series of operating-levers is temporarily locked until the registration of the preceding series is completed, when the auxiliary locking-lever $E^3$ is moved out of engagement with the other succeeding series by the push-rod $h^7$, connected at its rear end to the weighted bell-crank $H^4$ of one series and adapted to contact with the projecting flange $h^8$ on the auxiliary locking-lever of the next succeeding series, thus causing the registration of the different series to be performed in successive order from right to left whenever two or more keys in different series are simultaneously depressed. Whenever one registering-wheel has advanced a number of units corresponding to one unit of the next higher denomination, one of the projections $j$ on said wheel contacts with the sliding bar $j'$, which, through the medium of the roller $j^4$, contacts with the weighted arm $j^5$ on the sleeve $j^6$, which moves the arm $j^7$ on the pivoted pawl $j^8$ in contact with the teeth of the next succeeding registering-wheel, thus producing a movement of one notch of the wheel of the higher denomination, the parts being returned to their normal positions by the weighted arms $j^5$ as soon as the projection $j$ has passed the pawl $j'$.

It is obvious that the devices herein described may be variously modified in their mechanical construction without departing from the spirit of my invention. I do not therefore limit myself to the exact constructions shown.

Having thus described my invention, I claim—

1. In a cash-register, a series of gravity-levers, a spring-actuated cash-drawer, and a locking-lever for said drawer, adapted to be operated by the weight of any of said levers, indicators operated by said levers, and detachable means for holding each of said levers in their normal positions, substantially as specified.

2. The combination, with a series of gravity-levers and an independent trip and key for each of said levers, and an indicator connected to each of said levers, adapted to be elevated when said lever is released, of a spring-actuated cash-drawer and a locking device therefor, said locking device being arranged below said levers so to be operated by any one thereof when released, substantially as specified.

3. In a cash-register, the combination, with a normally-inactive registering-wheel having a series of teeth on the periphery thereof, of a rack normally out of mesh with said wheel, but adapted to engage with the teeth thereof, means for producing a longitudinal movement of said rack, and a series of stop-pins adjacent to said rack to determine the movement thereof, a series of keys connected through suitable intermediate mechanism to said stop-pins, and means for releasing said rack to permit it to engage said wheel when any of said keys are depressed, substantially as specified.

4. The combination, with a registering-wheel and a longitudinally-moving rack normally out of mesh with said wheel, but having teeth adapted to engage with similar teeth on the periphery of said wheel, of a series of stop-pins arranged at intervals equal to the pitch of the teeth of said rack and wheel in the direction of travel of said rack, means for bringing said rack into engagement with said wheel and producing a longitudinal movement thereof when said rack is released, and a series of keys adapted to move said stop-pins and at the same time disengage said rack, substantially as specified.

5. The combination, with a gear and rack having intermeshing teeth, said rack being normally held out of engagement with said gear, and means for bringing said rack when released into engagement with said gear, of a series of stop-pins arranged at intervals in the direction of the travel of said rack, a series of keys adapted to operate the respective pins, each of said keys being also adapted to release said rack, and means for producing a longitudinal movement of said rack until it contacts with one of said pins when thus released, substantially as specified.

6. The combination, with a gear-wheel and an intermeshing rack supported in a pivoted frame, in which it is adapted to move longitudinally, and means for moving said frame on its pivoted center when released to cause the rack to engage with said wheel, of a gear-segment supported in said frame and engaging said rack, a series of stop-pins, each adapted when moved to an unusual position to limit the movement of said rack, a series of keys, each connected to one of said stop-pins, and a catch for holding said frame, adapted to be released by the operation of any of the keys in the series, and means for revolving the gear-segment to cause the rack to travel longitudinally when the frame is released, substantially as specified.

7. The combination, with a gear-wheel and a rack having teeth adapted to intermesh with said gear, but normally disengaged therefrom, of a pivoted frame supporting said rack by bearings which permit the rack to move longitudinally, means on said frame for moving said rack, a catch for holding said frame in its normal position, stop-pins arranged at intervals to limit the travel of said rack, and means for disengaging said frame to permit the rack to engage with the wheel when one of said pins is elevated, substantially as specified.

8. The combination, with a gear-wheel and a rack having teeth adapted to mesh with said wheel, said rack being normally out of engagement with said wheel, but provided with means for causing said teeth to engage when said rack is released, of a series of stop-pins arranged at intervals in the direction of travel of said rack, each adapted when moved to an unusual position to limit the travel of said rack, means for moving said rack, a catch mechanism for releasing said rack when one of said pins is moved to an unusual position, and means, substantially as described, for disengaging said rack and wheel by the contact between said rack and one of the stop-pins, substantially as specified.

9. The combination, with a gear-wheel and an intermeshing rack, of a series of stop-pins adapted to limit the movement of said rack, and means, substantially as described, for disengaging said rack from said gear by the contact between said rack and pins, substantially as specified.

10. The combination of a gear-wheel and an intermeshing rack, and a series of stop-pins arranged at intervals in the direction of travel of said rack and adapted to limit the movement thereof, said pins being supported in a movable frame, as described, and means connected with said frame for disconnecting said rack from said gear when the rack has reached the limit of its travel against one of said pins, substantially as specified.

11. The combination, with a longitudinally-moving rack and its pivoted supporting-frame, of a registering-wheel adapted to be engaged by said rack, stop-pins adapted to engage said rack and arrest the same at different points in its travel, a movable plate or frame supporting said stop-pins, a series of keys adapted to operate the respective stop-pins, a catch for holding said pivoted frame adapted to be released by each of said keys, and means for moving said rack into engagement with said wheel when so released, and a connection from said pivoted frame adapted to disengage said rack from said wheel by the contact of any of the stop-pins of the series, substantially as specified.

12. The combination, with a pivoted frame having a sliding rack therein, of a weighted segment supported in said frame, adapted to support said rack, a gear-wheel arranged above said rack, a weighted lever normally connected to said frame to raise said frame when released into engagement with said gear, a latch on said frame adapted to release said rack when in mesh with said gear, stop-pins to limit the movement of said rack at different intervals in the travel thereof, a movable frame for supporting said pins, and a weighted bell-crank arm adapted to be released by the movement of said frame, and means for disconnecting the pivoted frame from said pivoted lever by the movement of said bell-crank arm, substantially as specified.

13. The combination, with a gear, of a sliding rack and its pivoted supporting-frame, a catch for holding said frame in its normal position with the rack out of engagement with said gear, means for moving said frame when released to cause said rack to engage with said gear, a catch on said frame for holding said rack, said catch being adapted to be disengaged by the movement of said frame when the rack is in engagement with the teeth of said gear, stop mechanism for limiting the movement of said rack at different points in the travel thereof, and means connected with said stop mechanism for disengaging said rack from said gear when it has reached the limit of its travel, determined by said stop mechanism, substantially as specified.

14. In a cash-register, the combination, with a moving cash-receptacle, of a number of keys and levers arranged in series, a registering mechanism for each series of keys and levers, a stop mechanism in one series adapted when a key is depressed simultaneously with a key in a preceding series to automatically lock the levers of said series until the registration of the preceding series is complete, substantially as specified.

15. The combination, in a cash-register, of a series of registering-wheels each adapted to register amounts of different denominations, and means for moving the wheels of a higher denomination by the movement of the wheels of a lower denomination, a series of keys for each registering-wheel, and a series of gravity-levers, one for each key, each adapted to set into operation said registering-wheel, an independent connection from each of said keys, and a locking-arm adapted to engage all of the levers of one series when one of said levers is released simultaneously with a lever in a preceding series, and means for automatically disengaging said locking-lever when the registration of the preceding series is complete, substantially as specified.

16. The combination, with a series of gravity-levers and a series of indicating-tablets, one for each lever, of a supporting-stem for each of said tablets independent of said levers, but adapted to be operated thereby, a trip-arm for each of said levers and a key for each trip-arm, a yielding frame contacting with said trip-arms, and a locking-arm adapted to engage with said yielding frame when one of said gravity-levers is released, substantially as specified.

17. The combination, with a series of gravity-levers and a series of keys adapted to release said levers, of an indicator for each lever independent thereof and adapted to be moved thereby, movable stop-pins, one for each lever, and a longitudinally-moving rack adapted to be engaged by each of said stop-pins when moved to an unusual position, a registering-wheel adapted to be moved by said rack, means for forcing said rack into engagement with said gear by a movement of any of the levers in said series, a spring-actuated cash-drawer adapted to be released by each of said levers, and means for returning the said levers and said rack to their normal positions as said drawer is closed, substantially as specified.

18. The combination, with a series of keys, operating-levers, and indicators, one for each key, said indicators being independent of said levers, but adapted to be operated thereby, of an engaging finger for holding each of said indicators when moved by said levers, a vibrating arm adapted to engage with said fingers, and a curved spring-wire connected to said vibrating arm and adapted to be engaged by projecting pins on the moving cash-drawer as said drawer is opened and thus release said indicators, substantially as specified.

19. The combination, with a spring-actuated cash-drawer and a series of operating-levers, each adapted to operate said drawer, of a series of indicators, one for each lever, projecting fingers $d^3$, adapted to engage with said indicators, vibrating arms $k'$, curved spring-wire $k^3$, and stop-pins $k^6$ $k^7$ on said drawer, substantially as specified.

20. The combination, with a series of gravity-levers and indicators, one for each lever, of a normally-closed spring-actuated cash-drawer, and a locking device adapted to be operated by each of said levers to open said drawer, a series of keys and trips, one for each lever, a yielding frame adapted to engage all of the trips of each series, a movable arm adapted when released to engage with said yielding frame and lock said frame in its normal position, and an auxiliary frame adapted to release said arm when moved by a contact with one of said levers when released, substantially as specified.

21. The combination, with a series of operating gravity-levers and a spring-actuated cash-receptacle adapted to be operated by each of said levers, of a pivoted trip for each of said levers and a yielding frame engaging all of the trips in the series, a key connected to each trip, a locking-arm adapted to engage said yielding frame when one of the operating-levers is released, a transverse bar arranged under the series of levers, and a pivoted weighted lever for engaging said bar and raising the levers to their normal positions as the drawer is closed, substantially as specified.

22. The combination, with a series of gravity-operating levers and their operating-keys, of the pivoted arms $h'$, bar $h$, pivoted weighted lever $I^2$, and a reciprocating cash-receptacle, substantially as and for the purpose specified.

23. The combination, with a series of registering-wheels and a series of levers for each wheel, of a longitudinally-moving rack adapted to engage each of said registering-wheels when released by the movement of one of said levers, stop-pins also operated by said levers, adapted to determine the movement of said rack, and intermediate projections on each of said registering-wheels adapted to engage with a moving arm having a connection with a pivoted pawl in engagement with the next registering-wheel of the series, and means, substantially as described, for causing the operating-levers in the different series to be disengaged in successive order, substantially as specified.

24. The combination, with the registering-wheels and their registering mechanism, of the intermediate projections $j$, sliding pawl $j'$, weighted arm $j^5$, sleeve $j^6$, arm $j^7$, and pawl $j^8$, substantially as specified.

25. The combination, with a registering-wheel having peripheral teeth and a rack normally disengaged from said teeth, of a pivoted frame supporting said rack, and a pivoted pawl on said frame adapted to engage said rack, and a rim or projection on said registering-wheel adapted to operate said pawl and disengage said rack as the same is brought into engagement with said gear-teeth, substantially as specified.

26. The combination, with a series of registering-wheels, each having an operating-rack, and a gear-segment adapted to move said rack, of a series of operating-levers for each wheel, each adapted when moved to an unusual position to cause said rack to engage with said gear and operate the same to register the amount represented by said lever, a spring-actuated cash-receptacle adapted to be released by the movement of each of said levers, the transverse pivoted bars $h$ and $h^2$, weighted pivoted lever $I^2$ on said drawer adapted to engage with one of said bars, and a link connection to the other bar, whereby the operating-levers and racks are returned to their normal positions by the closing of said drawer, substantially as specified.

27. The combination, with the pivoted frame F and a moving rack supported therein, of a weighted segment supported on said frame and engaging with said rack, a gravity-arm normally connected to said frame to move said frame when released to bring said rack into engagement with a registering-wheel, a projecting finger on said frame, and a hook-shaped projection adapted to engage with said finger, and an extended bar on said hook-shaped projection adapted to be engaged by each of the levers in a series when moved to an unusual position, and means connected with each lever for determining the travel of said rack, substantially as specified.

28. The combination, with a registering-wheel, of a pivoted frame and sliding rack supported therein, and a gravity-lever normally connected to said frame and adapted when said frame is released to move the same to cause the rack to engage with said registering-wheel, a weighted gear-segment supported on said frame and engaging with said rack, a stop mechanism for determining the travel of said rack, a pivoted catch on said frame for releasing said rack when said frame is moved to bring said rack into engagement with said wheel, and means, substantially as described, for disconnecting said gravity-lever from said frame and causing the rack to be disengaged from said wheel at the limit of travel of said rack, determined by said stop mechanism, substantially as specified.

In testimony whereof I have hereunto set my hand this 15th day of May, A. D. 1891.

HARRY M. NEER.

Witnesses:
PAUL A. STALEY,
CHAS. I. WELCH.